United States Patent [19]
Huang et al.

[11] Patent Number: 5,926,542
[45] Date of Patent: Jul. 20, 1999

[54] TELEPHONE CIRCUIT CAPABLE OF INHIBITING NOISE OF CUSTOMER PREMISES EQUIPMENT ALERTING SIGNAL

[76] Inventors: Wen-Liang Huang; Yuen-Hao Chang; Shen-Fan Chen, all of 2F, No. 20, Lane 204, Sung Shan Rd., Taipei, Taiwan

[21] Appl. No.: 08/974,494

[22] Filed: Nov. 19, 1997

[51] Int. Cl.[6] .................................................. H04M 1/00
[52] U.S. Cl. ...................... 379/392; 379/215; 379/93.35
[58] Field of Search .................................... 379/179, 252, 379/418, 373, 391, 387, 392, 215, 142, 399, 251, 253, 255, 372, 375, 406, 409, 93.35, 386, 177, 201

[56] References Cited

U.S. PATENT DOCUMENTS

| | | | |
|---|---|---|---|
| 5,263,084 | 11/1993 | Chaput et al. | 379/215 |
| 5,519,774 | 5/1996 | Battista et al. | 379/386 |
| 5,649,002 | 7/1997 | Brady et al. | 379/142 |
| 5,745,557 | 4/1998 | Anglikowski | 379/177 |

*Primary Examiner*—Nguyen Vo
*Assistant Examiner*—Charles N. Appiah
*Attorney, Agent, or Firm*—Browdy and Neimark

[57] ABSTRACT

A telephone circuit is composed of a current circuit, an hybrid circuit, a noise inhibiting unit, and a CAS detector circuit. The current circuit has two input ends connected with tip and ring of the telephone line, and two output ends connected with two input ends of the hybrid circuit. The signal received by two input ends of the hybrid circuit is analyzed. The noise inhibiting unit is connected in series between the hybrid circuit and the CAS detector circuit and is provided with at least one inhibiting circuit which has two input ends connected with the first signal line and the second signal line of the hybrid circuit. The output ends of the inhibiting circuit are connected with two input ends of the CAS detector circuit for minimizing the error of identifying the CAS signal by the CAS detector circuit.

7 Claims, 6 Drawing Sheets

TELEPHONE CIRCUIT CAPABLE OF INHIBITING NOISE OF CUSTOMER PREMISES EQUIPMENT ALERTING SIGNAL

FIELD OF THE INVENTION

The present invention relates generally to a telephone circuit, and more particularly to a telephone circuit capable of inhibiting CAS (customer premises equipment alerting signal) noise.

BACKGROUND OF THE INVENTION

The conventional telephone circuit is capable of providing the user with the caller identification service in conjunction with a telephone system company, such as AT&T. When the user is on the telephone, the hybrid circuit of the user's telephone is capable of receiving the CAS signal transmitted from the exchange at such time when a third person calls. The CAS signal is then transmitted to the CAS detector circuit for identification of the telephone number of the third person. However, the internal impedance of the hybrid circuit is not intended to cooperate with the frequency of the CAS signal, thereby unabling the internal impedance of the hybrid circuit to match very well with the impedance of both tip and ring of the telephone line. In addition to the CAS signal, a small portion of the voice signal which come from the microphone of a near-end telephone set can also appear on the CAS detector circuit. When the CAS signal is transmitted by the exchange, the CAS detector circuit is incapable of identifying the CAS signal if the voice frequency received by the microphone of the near-end telephone set is close to the CAS signal frequency (2130 Hz or 2750 Hz).

SUMMARY OF THE INVENTION

The primary objective of the present invention is therefore to provide a telephone circuit capable of minimizing the CAS noise level so as to improve the accuracy of the identification of the CAS signal transmitted from an exchange.

In keeping with the principle of the present invention, the foregoing objective of the present invention is attained by a telephone circuit consisting of a current circuit, a hybrid circuit, a noise inhibiting unit, and a CAS detector circuit. The current circuit has two input ends connected with tip and ring of the telephone line, and two output ends connected with two input ends of the hybrid circuit. The signal received by the two input ends of the hybrid circuit is analyzed. The noise inhibiting unit is connected in series between the hybrid circuit and the CAS detector circuit and is provided with at least one inhibiting circuit which has two input ends connected with the first signal line and the second signal line of the hybrid circuit. The output ends of the noise inhibiting circuit are connected with two input ends of the CAS detector circuit for minimizing the error of identifying the CAS signal by the CAS detector circuit.

The foregoing objective, features and functions of the present invention will be more readily understood upon a thoughtful deliberation of the following detailed description of the embodiments of the present invention with reference to the accompanying drawings.

DETAILED DESCRIPTION OF THE INVENTION

Figure 1:
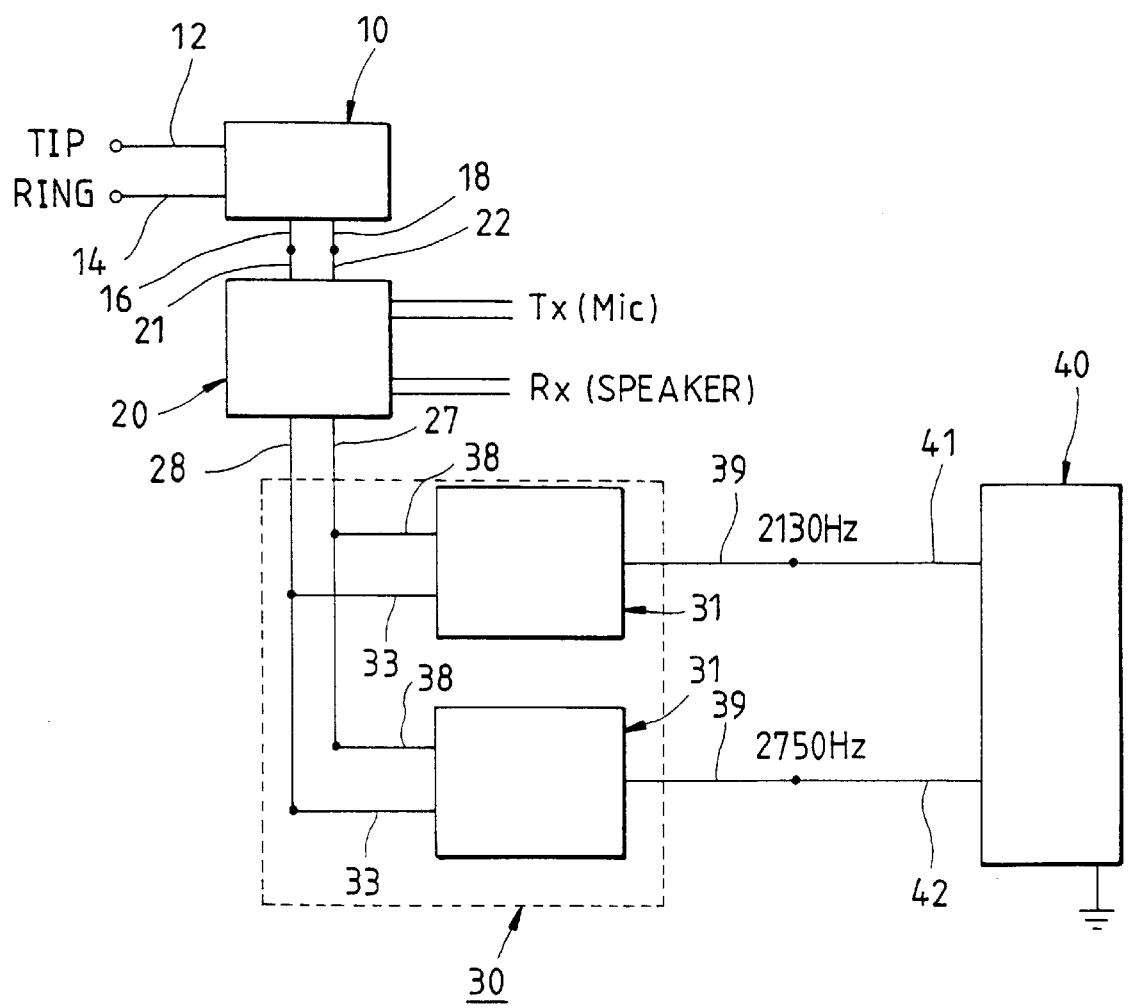
FIG. 1 shows a block diagram of a first preferred embodiment of the present invention.
Figure 2:
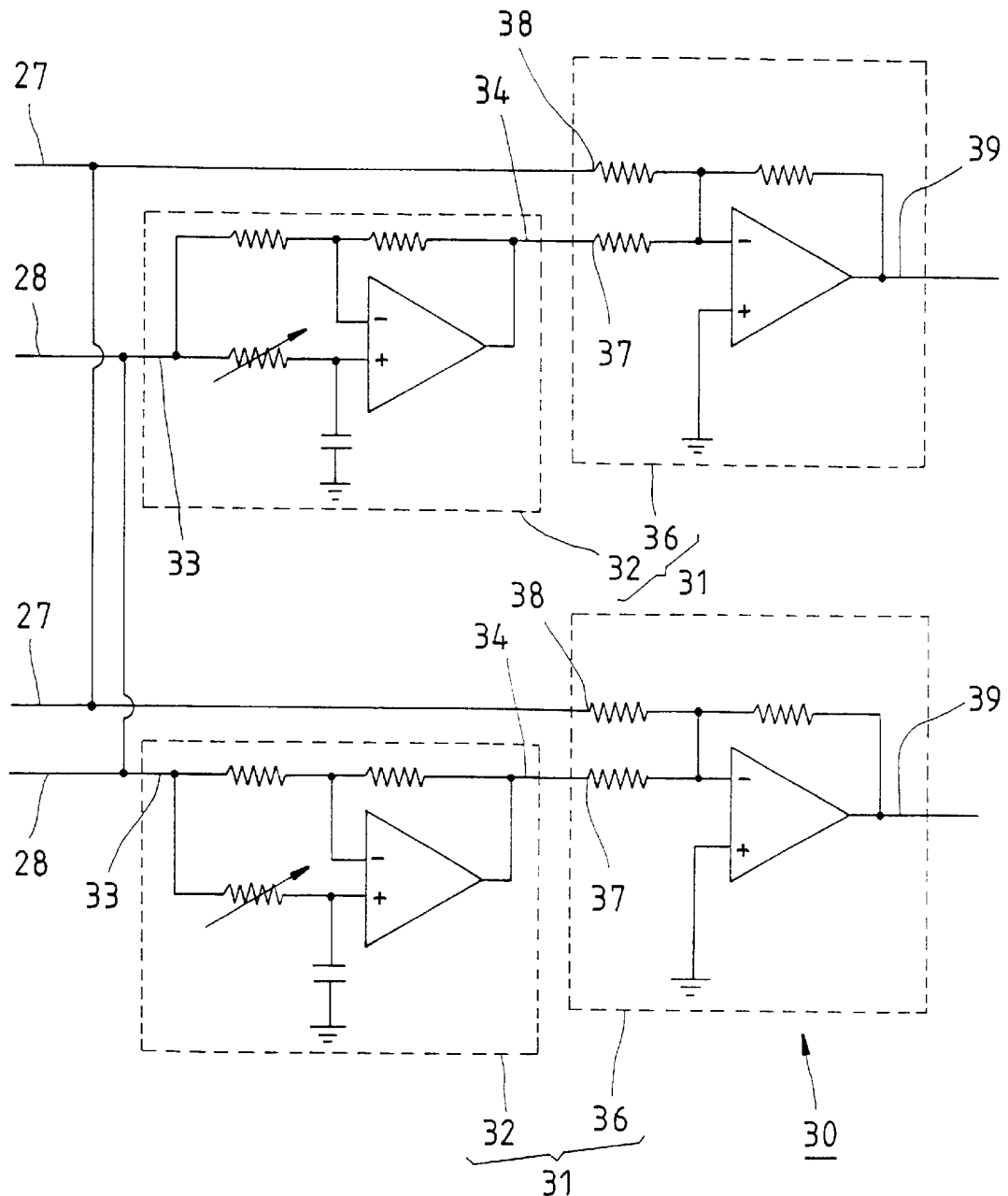
FIG. 2 shows a circuitry of the noise inhibiting unit of the first preferred embodiment of the present invention.

As illustrated in FIGS. 1 and 2, a telephone circuit of the first preferred embodiment of the present invention is composed of a current circuit 10, a hybrid circuit 20, a noise inhibiting unit 30, and a CAS detector circuit 40.

The current circuit 10 is intended to provide a telephone with the current signal at such time when the telephone is "OFF HOOK". The current circuit 10 has two input ends 12 and 14, which are connected with two signal input lines (tip and ring) of the telephone line. Two output ends 16 and 18 are derived from the current circuit 10.

The hybrid circuit 20 has two input ends 21 and 22, which are connected with the two output ends 16 and 18 of the current circuit 10. Four signal lines of Tx and Rx are derived from the hybrid circuit 20 for connecting with a microphone and a receiver of the telephone. A first signal line 27 and a second signal line 28 are derived from the hybrid circuit 20.

The CAS detector circuit 40 has two input ends 41 and 42. The CAS detector circuit 40 is intended to detect and judge the CAS signal transmitted by the exchange. The detection frequencies of the two input ends 41 and 42 are respectively 2130 Hz and 2750 Hz.

The feature of the present invention is the noise inhibiting unit 30, which is connected in series between the hybrid circuit 20 and the CAS detector circuit 40 and is provided with two inhibiting circuits 31 identical in construction to each other. Each of the two inhibiting circuits 31 has a phase lag adjustment circuit 32 and an summing circuit 36. The phase lag adjustment circuit 32 is formed of an OP amplifier in cooperation with resistors and capacitors. The phase lag adjustment circuit 32 has an output end 34, which is connected with a first input end 37 of the summing circuit 36. The summing circuit 36 has a second input end 38, which is connected with the first signal line 27 of the hybrid circuit 20. The two summing circuit 36 has two output ends 39, which are the output ends of the noise inhibiting unit 30. The two output ends 39 of the noise inhibiting circuit 30 are connected with the two input ends 41 and 42 of the CAS detector circuit 40. These two inhibiting circuits 31 of the noise inhibiting unit 30 are different in resistance value and capacitance value and are therefore capable of processing the frequencies of 2130 Hz and 2750 Hz.

Figure 3:
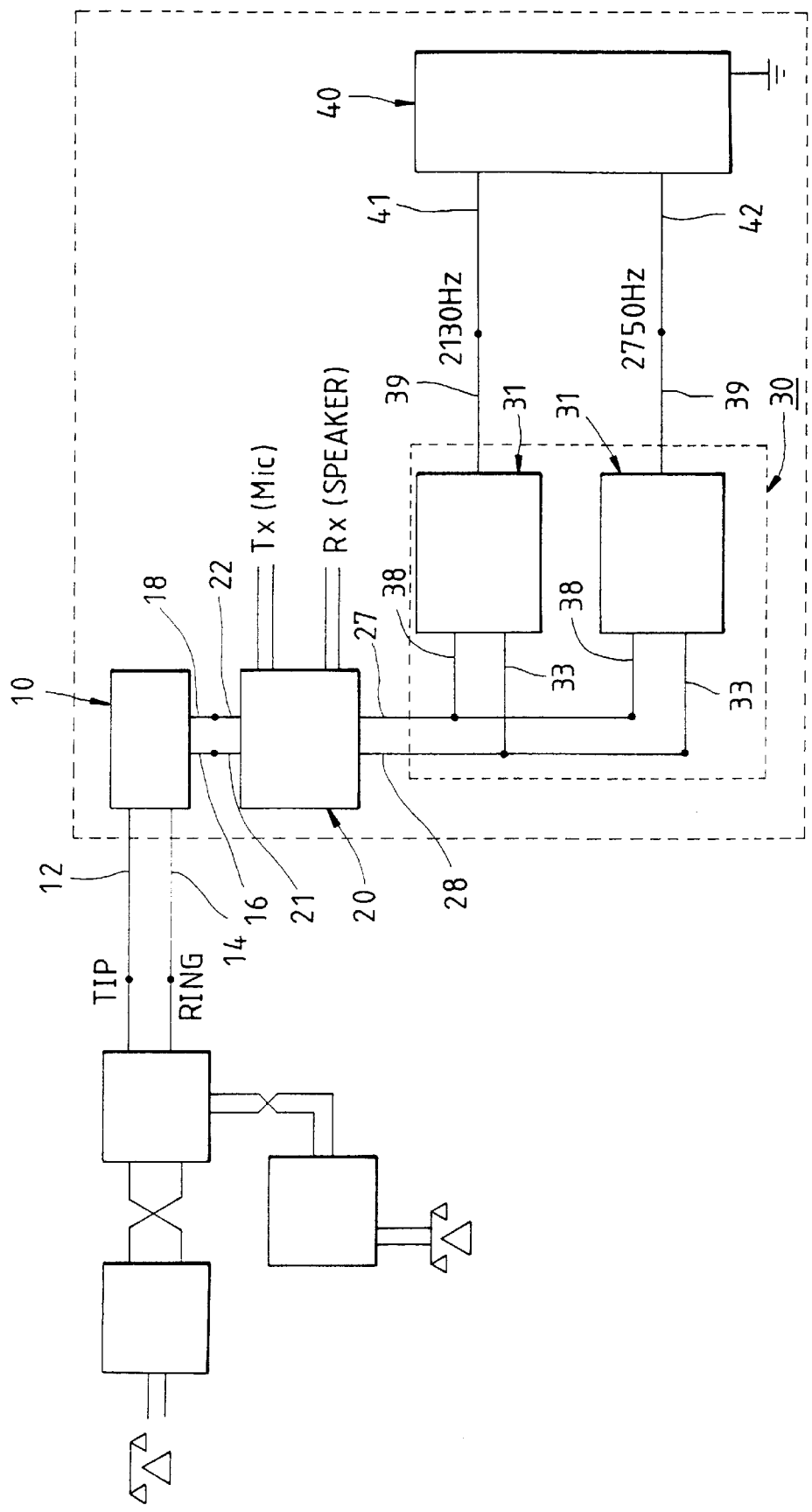
FIG. 3 is a schematic view showing that the first preferred embodiment of the present invention is connected with a central office in conjunction with a call waiting service.

As illustrated in FIG. 3, the telephone line is connected with a telephone set via two input ends (tip and ring). The current circuit 10 is used to provide the "OFF HOOK" current signal and to transmit the signals of tip and ring ends to the hybrid circuit 20 by which the signals are converted to the voice signals of Tx and Rx. When compared with the grounded point of the hybrid circuit 20, the audio signals derived from the tip and the ring ends have the same phase at the first signal line 27 and the second signal line 28. But when compared with the grounded point of the hybrid circuit 20, the audio signals derived from the microphone shows an inverted phase of 180-degree phase displacement at these two signal lines 27 and 28 of the hybrid circuit 20. All the audio signals on the first and the second signal lines 27 and 28 are transmitted to the noise inhibiting unit 30 so as to bring about the phase adjustment and the phase cancellation of the audio signals derived from the microphone for minimizing their signal level to inhibit the transmission of such audio signals to the output end 39 of the noise inhibiting unit 30. However, the CAS signal via the tip and the ring ends to the signal lines 27 and 28 have the same phase, thereby preventing the CAS signal from being cancelled out. In the meantime, the noise of the microphone is cancelled out, so as to enable the detector circuit 40 to identify the CAS signal correctly.

Figure 4:
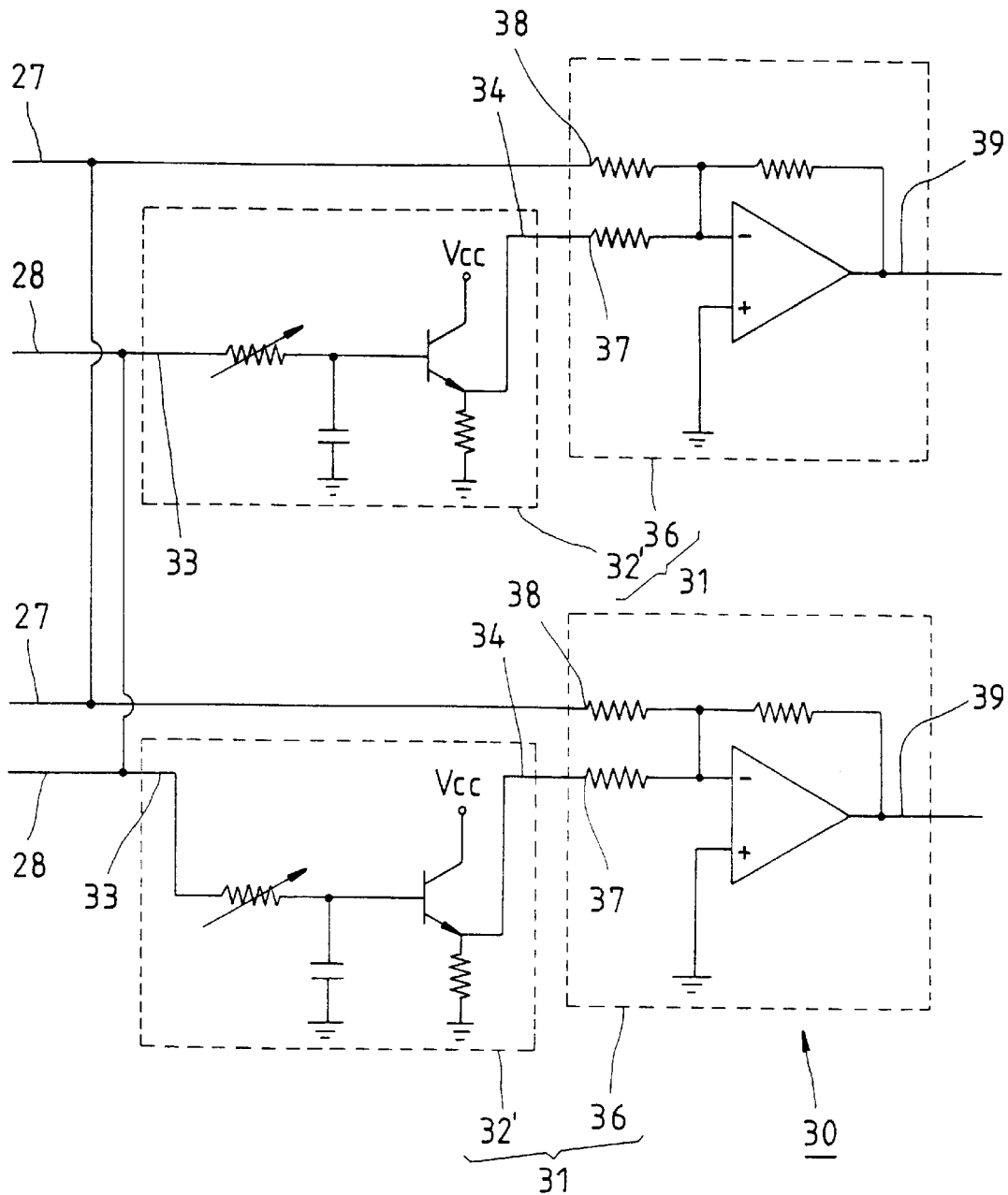
FIG. 4 shows a circuitry of the noise inhibiting unit of a second preferred embodiment of the present invention.

As shown in FIG. 4, the telephone circuit of the second preferred embodiment is basically similar to that of the first preferred embodiment described above, with the difference being that the second preferred embodiment consists of a phase lag adjustment circuit 32' which is formed of a transistor in cooperation with resistors and capacitors.

Figure 5:
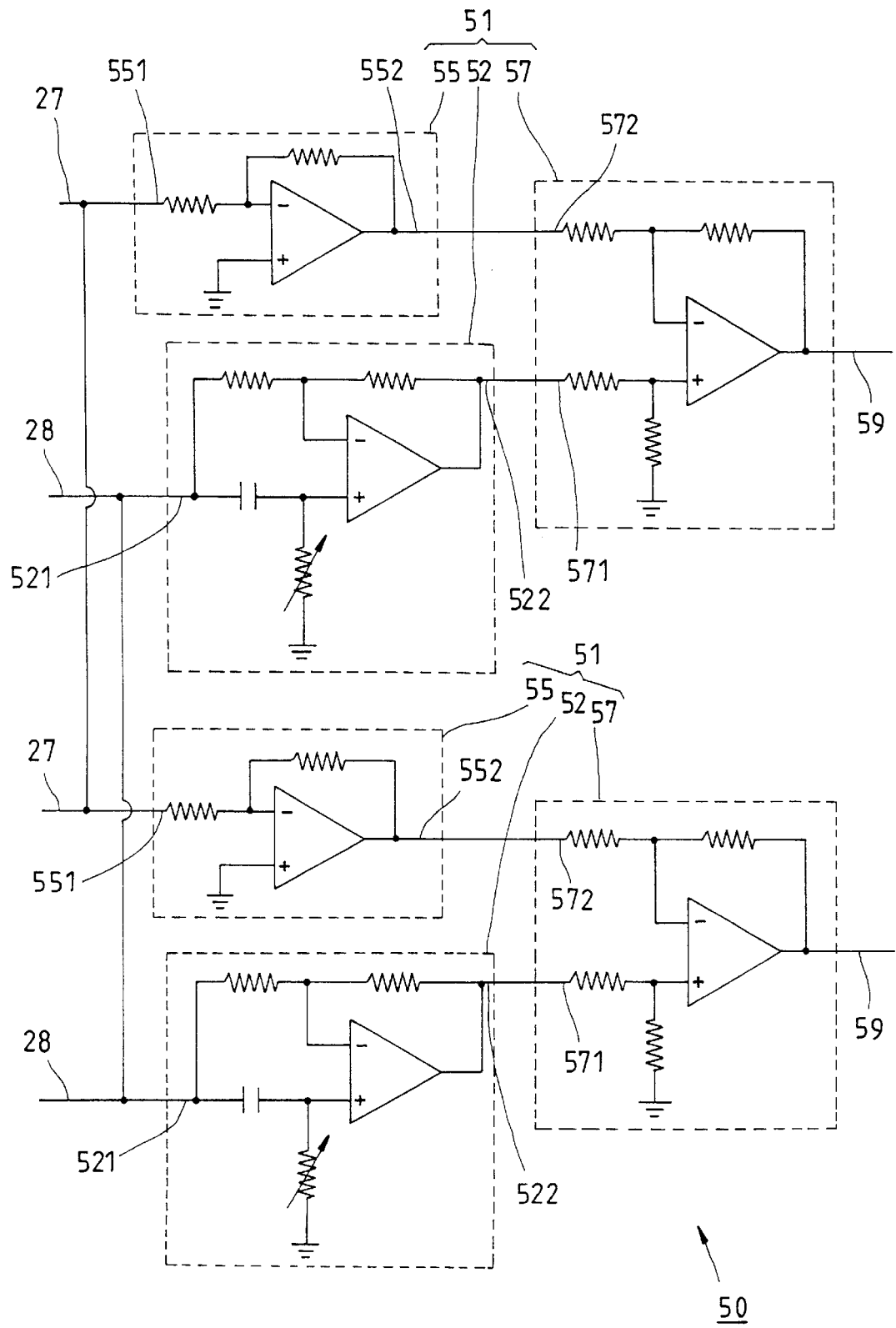
FIG. 5 shows a circuitry of the noise inhibiting unit of a third preferred embodiment of the present invention.

As shown in FIG. 5, the telephone circuit of the third preferred embodiment is basically similar to that of the first preferred embodiment described above, with the difference being that the third preferred embodiment consists of a noise inhibiting unit 50 composed of inhibiting circuits 51 each having a phase lead adjustment circuit 52, an inversion circuit 55, and a subtraction circuit 57. The phase lead adjustment circuit 52 is formed of an OP amplifier in cooperation with resistors and capacitors and is provided with an input end 521 which is connected with the second signal line 28, and an output end 522 which is connected with a first input end 571 of the subtraction circuit 57. The inversion circuit 55 has an input end 551 which is connected with the first signal line 27, and an output end 552 which is connected with the second input end 572 of the subtraction circuit 57. The output end 59 of the subtraction circuit 57 is the output end of the noise inhibiting unit 50. The output ends 59 of the inhibiting circuits 51 are connected with the input ends 41 and 42 of the CAS detector circuit 40. These two inhibiting circuits 51 are different in resistance value and capacitance value and are therefore used for processing the frequencies of 2130 Hz and 2750 Hz.

After the signal of the first signal line 27 is inverted by the inversion circuit 55 and is then subtracted by the subtraction circuit 57 and the output signal of the phase lead adjustment circuit 52, the test result is as good as that of the first preferred embodiment of the present invention. The use of the lag circuit of the first preferred embodiment or the lead circuit of the third preferred embodiment is dependent on the relative phase between the first signal line 27 and the second signal line 28. In addition, the noise inhibiting unit 30 or 50 of the present invention may consist of only one inhibiting circuit aiming at only one of the two frequencies of 2130 Hz and 2750 Hz. However, the noise inhibiting unit consisting of one inhibiting circuit is inferior in effect to the noise inhibiting unit consisting of two inhibiting circuits.

Figure 6:
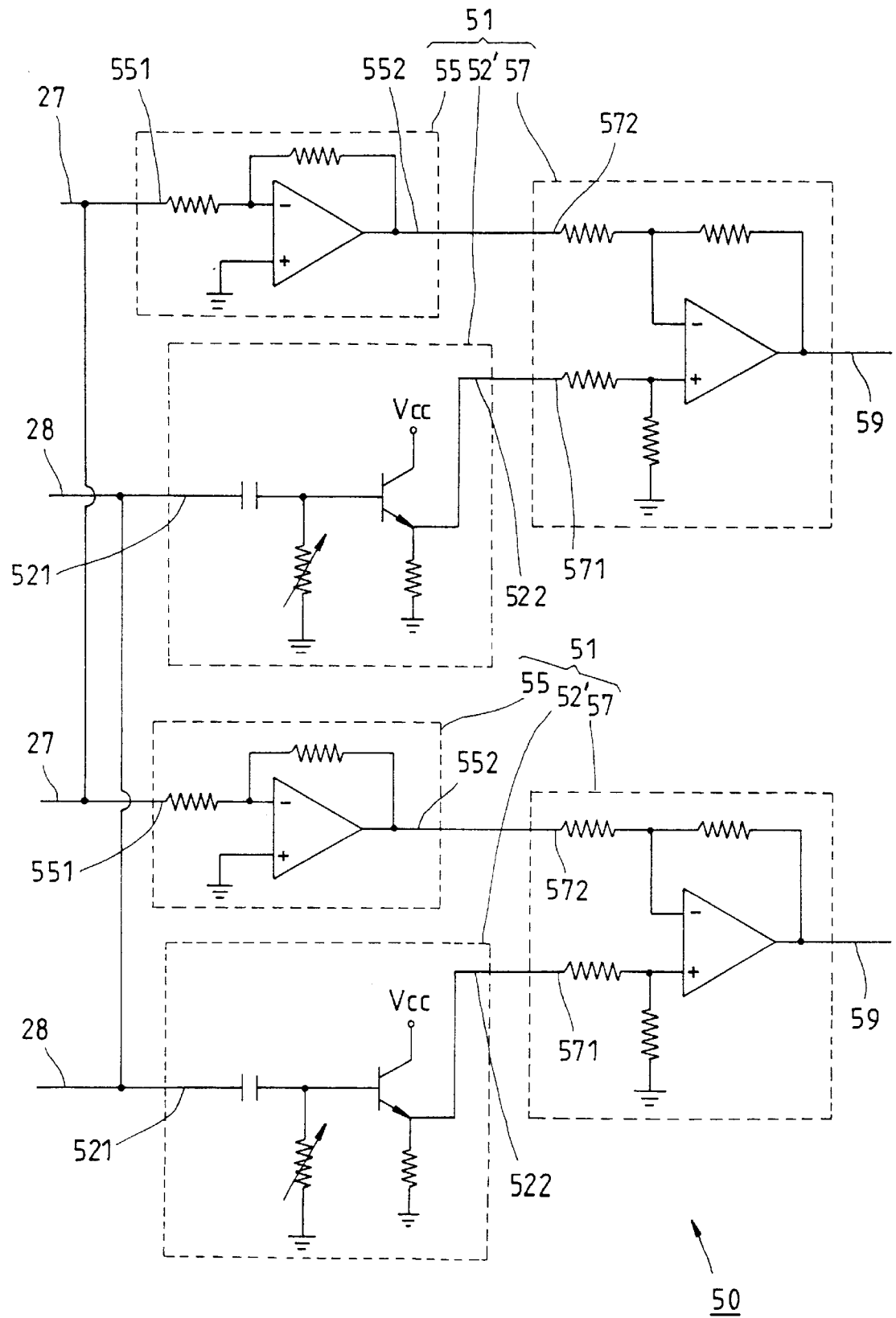
FIG. 6 shows a circuitry of the noise inhibiting unit of a fourth preferred embodiment of the present invention.

As shown in FIG. 6, the telephone circuit of the fourth preferred embodiment is basically similar to that of the third preferred embodiment described above, with the difference being that the fourth preferred embodiment consists of a phase lead adjustment circuit 52' which is formed of a transistor in cooperation with resistors and capacitors.

The embodiments of the present invention described above are to be deemed in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. A telephone circuit having a function of inhibiting CAS noise, said telephone circuit comprising:

a current circuit for providing a telephone set with an "OFF HOOK" current signal, said current circuit having two input ends connected with two signal input lines (tip and ring) of a telephone line, said current circuit further having two output ends;

a hybrid circuit having two input ends connected with said two output ends of said current circuit such that signals received by said two input ends of said hybrid circuit are analyzed as Tx and Rx four line signal circuits connected with a microphone and a receiver of the telephone set, said hybrid having a first signal line and a second signal line;

a CAS detector circuit having two input ends; and a noise inhibiting unit connected in series between said hybrid circuit and said CAS detector circuit, said noise inhibiting unit having at least one inhibiting circuit, said inhibiting circuit having two input ends connected with said first signal line and said second signal line, said inhibiting circuit having an output end connected with said two input ends of said CAS detector circuits, wherein said inhibiting circuit of said noise inhibiting unit has a phase lag adjustment circuit and an input end connected with said second signal line, and summing circuit having a first input end connected with the output end of said phase lag adjustment circuit, said summing circuit having a second input end connected with said first signal line, said summing circuit having an output end serving as an output end of said inhibiting circuit.

2. The telephone circuit as defined in claim 1, wherein said phase lag adjustment circuit is formed of an OP amplifier in cooperation with resistors and capacitors.

3. The telephone circuit as defined in claim 1, wherein said phase lag adjustment circuit is formed of a transistor in cooperation with resistors and capacitors.

4. The telephone circuit as defined in claim 2, wherein said inhibiting circuit of said noise inhibiting unit has a phase lead adjustment circuit, a subtraction circuit, and an inversion circuit, said phase lead adjustment circuit having an input end connected with said second signal line and further having an output end connected with a first input end of said subtraction circuit, said inversion circuit having an input end connected with said first signal line and further having an output end connected with a second input end of said subtraction circuit, said subtraction circuit having an output end serving as an output end of said noise inhibiting unit.

5. The telephone circuit as defined in claim 4, wherein said phase lead adjustment circuit is formed of an OP amplifier in cooperation with resistors and capacitors.

6. The telephone circuit as defined in claim 4, wherein said phase lead adjustment circuit is formed of a transistor in cooperation with resistors and capacitors.

7. The telephone circuit as defined in claim 2, wherein said noise inhibiting unit has two inhibiting circuits identical in construction to each other, each of said two inhibiting circuits having two input ends connected respectively with said first signal line and said second signal line, each of said two inhibiting circuits having an output end connected with one of two input ends of said CAS detector circuit.

* * * * *